（12）United States Patent
Choi et al.

(10) Patent No.: US 7,684,216 B2
(45) Date of Patent: Mar. 23, 2010

(54) QUASI RESONANT SWITCHING MODE POWER SUPPLY

(75) Inventors: Hang-Seok Choi, Kunpo (KR); Jin-Tae Kim, Bucheon-si (KR); Jae-Hwoan Chi, Seoul (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 158 days.

(21) Appl. No.: 12/079,703

(22) Filed: Mar. 28, 2008
(Under 37 CFR 1.47)

(65) Prior Publication Data
US 2009/0091955 A1 Apr. 9, 2009

(30) Foreign Application Priority Data
Mar. 28, 2007 (KR) .................. 10-2007-0030307

(51) Int. Cl.
*H02M 3/335* (2006.01)
(52) U.S. Cl. .................. 363/21.16; 363/41; 363/16; 363/21.13
(58) Field of Classification Search .............. 363/21.16, 363/41, 16, 21.13
See application file for complete search history.

(56) References Cited
U.S. PATENT DOCUMENTS
5,497,311 A 3/1996 Hanawaka

| 5,680,034 | A | * | 10/1997 | Redl ................ 363/21.03 |
|---|---|---|---|---|
| 5,729,443 | A | | 3/1998 | Pavlin |
| 5,831,839 | A | | 11/1998 | Pansier |
| 6,515,876 | B2 | | 2/2003 | Koike et al. |
| 6,529,391 | B2 | | 3/2003 | Yoshinaga et al. |
| 6,842,350 | B2 | | 1/2005 | Yamada et al. |
| 7,035,119 | B2 | | 4/2006 | Koike |

* cited by examiner

*Primary Examiner*—Shawn Riley
(74) *Attorney, Agent, or Firm*—Sidley Austin LLP

(57) ABSTRACT

A switching mode power supply (SMPS) and a driving method thereof are provided. The SMPS includes a power supply block that includes a first switch coupled to a first coil of a primary side of a transformer for converting an input voltage, wherein the power supply block supplies power to a second coil and a third coil of a secondary side of the transformer according to operation of the first switch; and a PWM signal generator determines a turn-on time of the first switch according to the input voltage, and the turn-on time is determined regardless of a power magnitude of an output terminal connected to the second coil. Accordingly, screen noise due to a ripple can be eliminated and stress on the switch breakdown due to excessive power input can be reduced to enable an SMPS with stable driving.

17 Claims, 10 Drawing Sheets

QUASI RESONANT SWITCHING MODE POWER SUPPLY

CROSS-REFERENCE TO RELATED APPLICATION

This application claims priority to and the benefit of Korean Patent Application No. 10-2007-0030307 filed in the Korean Intellectual Property Office on Mar. 28, 2007, the entire contents of which are incorporated herein by reference.

BACKGROUND

1. Field of the Invention

The present invention relates to a switching mode power supply (SMPS). More particularly, the present invention relates to a quasi-resonant switching type SMPS and a driving method thereof.

2. Description of the Related Art

An SMPS is a device that rectifies an input AC voltage to an input DC voltage (DC-link voltage) and converts the input DC voltage to an output DC voltage having a different level. The output DC voltage can be higher or lower than the input DC voltage. The SMPS is generally used for battery supplies that power electronic devices, in particular, digital televisions and computer displays.

A quasi-resonant SMPS turns on a main switch at valleys of the drain-source voltage (Vds) of the switch.

FIG. 1 is a diagram illustrating a relationship between the switching frequency fs and the output power (Po) of a conventional quasi-resonant SMPS when the input AC voltage is 110V or 220V.

FIG. 1 illustrates that the output power Po of the SMPS decreases as the switching frequency fs increases. Accordingly, as Po decreases, switching losses increase. As also shown, when the AC input voltage Vin increases, the switching frequency fs further increases. As a result, there may be an increase in switching losses and audible noise due to intermittent switching.

FIG. 2 illustrates distributions of the input power limit $Pin^{Lim}$ and the switching frequency fs as a function of the input voltage Vin of a conventional quasi-resonant SMPS. $Pin^{Lim}$ depends upon the current limit $I_{Lim}$ of the SMPS. In the operation of the conventional quasi-resonant SMPS, a current flowing from the drain to the source of the main switch Ids is prevented from exceeding $I_{Lim}$. Accordingly, the input power Pin of the SMPS is limited not to exceed a predetermined level, the input power limit $Pin^{Lim}$, to prevent excessive power input.

However, even when Ids is limited to the current limit $I_{Lim}$, the input power Pin is not necessarily limited to $Pin^{Lim}$. As shown in FIG. 2, as Vin increases, the switching frequency fs can increase and the input power limit $Pin^{Lim}$ increases. Accordingly, there may be excessive power input into the SMPS, placing stress on the main switch, possibly damaging the switch.

A conventional quasi-resonant SMPS can solve this problem by turning on the main switch at a minimum of a second valley of the Vds voltage when the switching frequency fs exceeds a reference frequency. This is described with reference to FIG. 3.

FIG. 3 is a diagram illustrating the switching of the main switch of a conventional quasi-resonant SMPS at a minimum of a minimum of a first valley or minimum of a second valley of the Vds voltage, depending upon the output power Po and the switching frequency fs.

As shown in FIG. 3, the conventional quasi-resonant SMPS turns on the main switch at a minimum of a second valley of the Vds voltage if the switching frequency fs is greater than a reference frequency due to a small output power Po. However, the SMPS turns on the main switch at a minimum of a first valley of the Vds voltage if the switching frequency fs is smaller than a reference frequency due to a large output power Po. Accordingly, the SMPS turns on the main switch at a minimum of a second valley of the Vds voltage when output power Po is small to prevent the switching frequency fs from exceeding a predetermined level, thereby protecting the switch from excessive power input and stress.

However, due to a change of the output power Po in the conventional quasi-resonant SMPS, a ripple is generated in the output voltage Vo when the turn-on time of the main switch changes from a minimum of a minimum of a first valley of the Vds voltage to a minimum of a second valley of the Vds voltage, or when the turn-on time of the main switch changes from a minimum of a second valley of the Vds voltage to a minimum of a minimum of a first valley. In particular, the ripple generates noise on a screen when the SMPS is used for an image display device such as a cathode ray tube (CRT) TV. The ripple may be even more pronounced for a high definition television (HDTV).

The above information disclosed in this Background section is only for enhancement of understanding of the background of the invention, and therefore it may contain information that does not form the prior art that is already known in this country to a person of ordinary skill in the art.

SUMMARY

Briefly and generally, embodiments include an SMPS and a driving method thereof having the advantages of preventing excessive power input and eliminating screen noise caused by a ripple.

In one aspect, an SMPS includes a power supply block having a first switch coupled to a first coil of a primary side of a transformer for converting an input voltage, wherein the power supply block supplies power to a second coil and a third coil of a secondary side of the transformer according to operation of the first switch; and a PWM signal generator that receives a feedback voltage corresponding to a first voltage generated in the second coil, a sensing signal corresponding to a current flowing to a first switching transistor, and a third voltage corresponding to a second voltage generated in the third coil to control on/off of the first switch, wherein the PWM signal generator determines a turn-on time of the first switch according to the input voltage, and the turn-on time is determined regardless of a power magnitude of an output terminal connected to the second coil.

Another embodiment provides a method of driving an SMPS that supplies power to a second coil and a third coil of a secondary side of a transformer according to operation of a switch coupled to a first coil of a primary side of the transformer for converting an input voltage, including: a) comparing the input voltage with that of a predetermined first voltage; b) turning on the switch at a minimum of a minimum of a first valley of a voltage applied to the switch if the input voltage is lower than the first voltage; and c) turning on the switch at a minimum of a second valley of a voltage applied to the switch if the input voltage is higher than the first voltage.

Yet another embodiment provides a method of driving an SMPS that supplies power to a second coil and a third coil of a secondary side of a transformer according to operation of a switch coupled to a first coil of a primary side of the transformer for converting an input voltage, including: a) generating a first signal for maintaining a first level during a first period from when the switch is turned on; b) comparing a length of the first period with that of a second period in which the switch maintains an ON state; c) turning on the switch if the first period is shorter than the second period at a minimum of a minimum of a first valley of a voltage applied to the switch; and d) turning on the switching element if the first period is longer than the second period at a minimum of a second valley of a voltage applied to the switch.

DETAILED DESCRIPTION OF THE EMBODIMENTS

Figure 1:
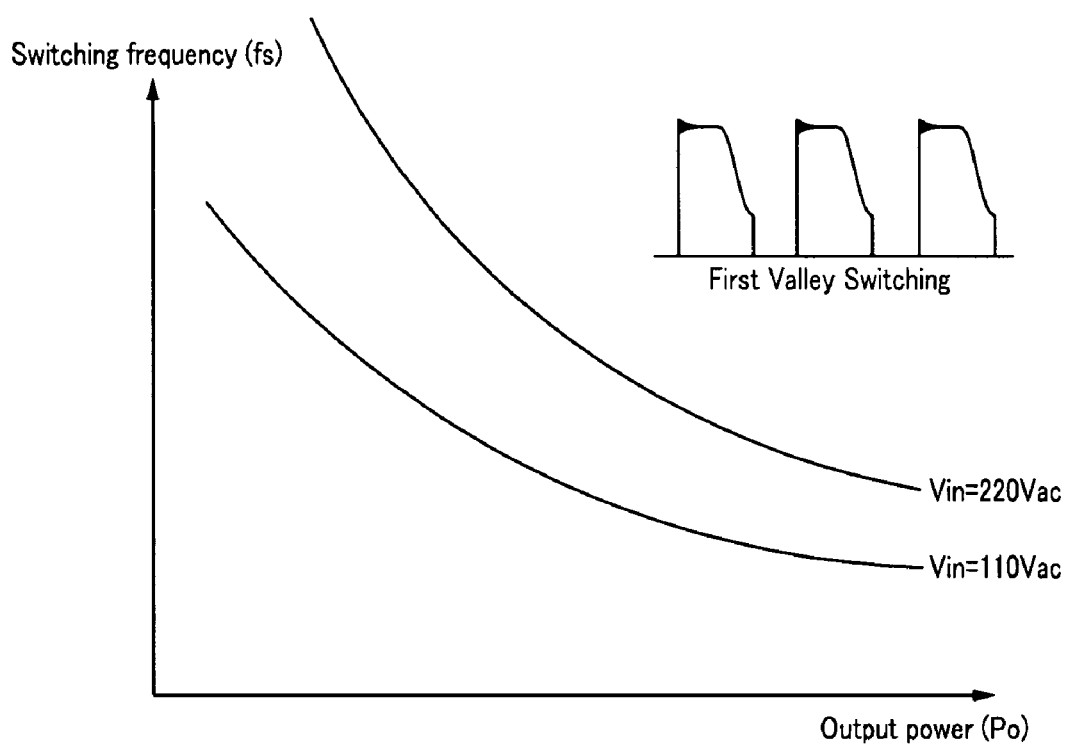
FIG. 1 illustrates a relationship between a switching frequency fs and an output power Po of a conventional quasi-resonant SMPS when an input AC voltage is 110V and 220V.
Figure 2:
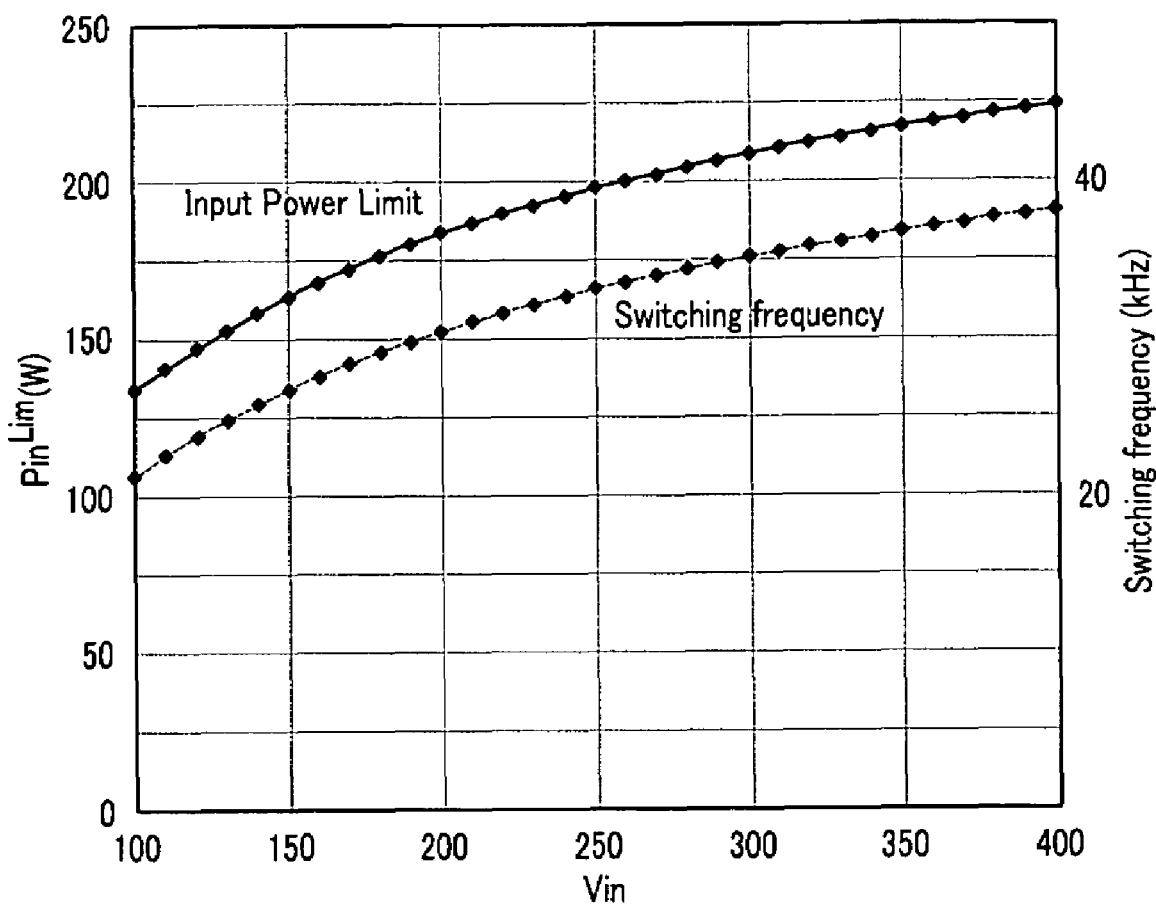
FIG. 2 illustrates distributions of an input power limit $Pin^{Lim}$ and a switching frequency fs corresponding to a Vin of a conventional quasi-resonant SMPS.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element, or "electrically coupled" to the other element through one or more additional elements.

Further, throughout this specification, after the main switch of an SMPS is turned off, the minimum of the drain-source voltage of the main switch is referred to as a "valley." The first minimum of the drain-source voltage of the main switch is referred to as a "minimum of a minimum of a first valley" and the second minimum of the drain-source voltage of the main switch is referred to as a "minimum of a second valley".

Figure 4:
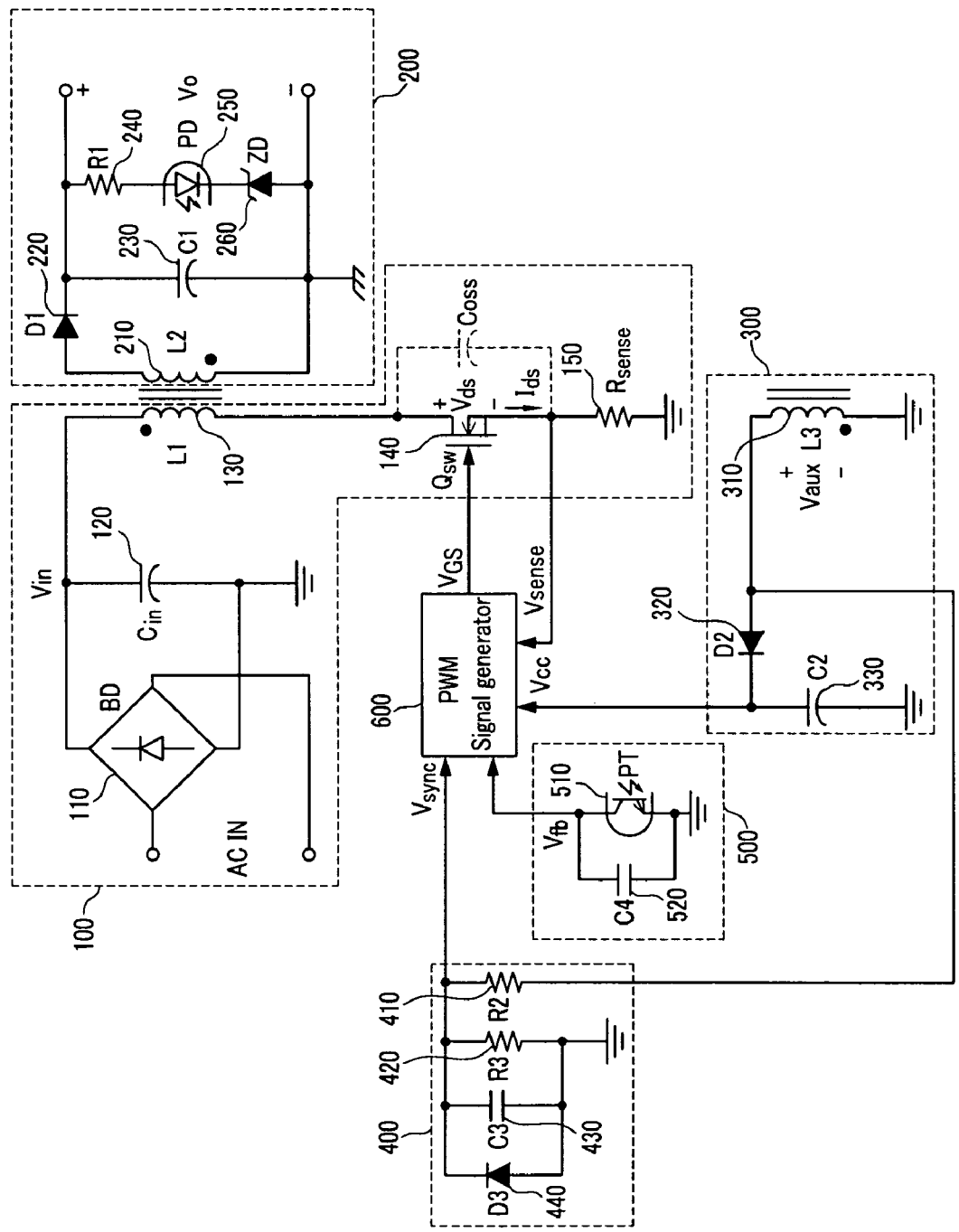
FIG. 4 is a schematic circuit diagram of an SMPS.

FIG. 4 is a schematic circuit diagram of an SMPS. The SMPS may include a power supply block 100, an output block 200, a bias voltage supply block 300, a sync voltage generator block 400, a feedback circuit block 500, and a PWM signal generator 600.

The power supply block 100 may include a bridge diode (BD) 110 for rectifying an AC input ACin, a capacitor (Cin) 120 for smoothing a rectified voltage, a primary coil (L1) 130 of a transformer having a first terminal connected to the capacitor 120, a switching transistor (Qsw) 140, also referred to as a main switch. The drain of the switching transistor 140 can be connected to a second terminal of the primary coil 130 of the transformer, and a detection resistor (Rsense) 150 connected between a source of the switching transistor 140 and a ground terminal to detect the current flowing from the drain to the source of the switching transistor 140 (Ids). The switching transistor 140 can be implemented as a metal oxide semiconductor field effect transistor (MOSFET).

The power supply unit 100 can convert the input AC voltage ACin to a DC voltage Vin through the bridge diode 110 and the capacitor 120, and can supply power to a secondary coil (L2) 210 of the transformer, which is a part of the output block 200, according to the duty of the switching transistor 140.

The output unit 200 may include the secondary coil 210 of the transformer, a diode (D1) 220 having an anode connected to a first terminal of the secondary coil 210 of the transformer, a capacitor (C1) 230 connected between a cathode of the diode 220 and a ground, a resistor (R1) 240 having a first terminal connected to a cathode of the diode 220, a photodiode (PD) 250 having an anode connected to a second terminal of the resistor 240, and a zener diode (ZD) 260 having a cathode connected to a cathode of the photodiode 250 and having an anode connected to ground. Here, a voltage across the capacitor 230 is an output voltage Vo, and the current of the photodiode 250 changes according to output voltage Vo. The photodiode 250 and the phototransistor (PT) 510 of the feedback circuit block 500 constitute a photocoupler, which provides information corresponding to the output voltage Vo to the feedback circuit block 500.

The bias voltage supply block 300 may include a tertiary coil (L3) 310 of the transformer, a diode (D2) 320 having an anode connected to a first terminal of the secondary coil 310 of the transformer, and a capacitor (C2) 330 connected between a cathode of the diode 320 and ground. The PWM signal generator 600 can generally be realized by using an IC, and the bias voltage supply block 300 can supply a bias voltage Vcc for operating the IC. When the switching transistor 140 starts switching, the secondary coil 310 of the transformer can generate a voltage Vaux to charge the capacitor 330 through the diode 320 with a bias voltage Vcc.

The sync voltage generator block 400 may include a resistor (R2) 410 having a first terminal connected to the first terminal of the tertiary coil (L3) 310 of the transformer, a resistor (R3) 420 having a first terminal connected to a second terminal of the resistor 410 and a second terminal connected to ground, a capacitor (C3) 430 having a first terminal connected to a second terminal of the resistor 410 and a second terminal connected to ground, and a diode (D3) 440 having a cathode connected to the first terminal of the capacitor 430 and an anode connected to ground. The sync voltage generator block 400 can supply a sync voltage Vsync that changes linearly and has a smaller amplitude than that of Vaux.

The feedback circuit block 500 may include a phototransistor (PT) 510 and a capacitor (C4) 520 connected in parallel to the phototransitor 510. The phototransistor 510 and the photodiode 250 of the output block 200 constitute a photocoupler. The phototransistor 510 may be controlled by the current flowing through the photodiode 250 such that if the output voltage Vo increases, a feedback voltage Vfb charged to the capacitor 520 decreases, and if the output voltage Vo decreases, the feedback voltage Vfb charged to the capacitor C4 increases.

The PWM signal generator 600 can receive a feedback signal Vfb and a sense signal Vsense that senses the Ids. The PWM signal generator 600 may compare the feedback signal Vfb to the sense signal Vsense and generate a pulse width modulating signal, output as a gate control signal $V_{GS}$ for controlling a switching operation of the transistor 140.

Figure 5:
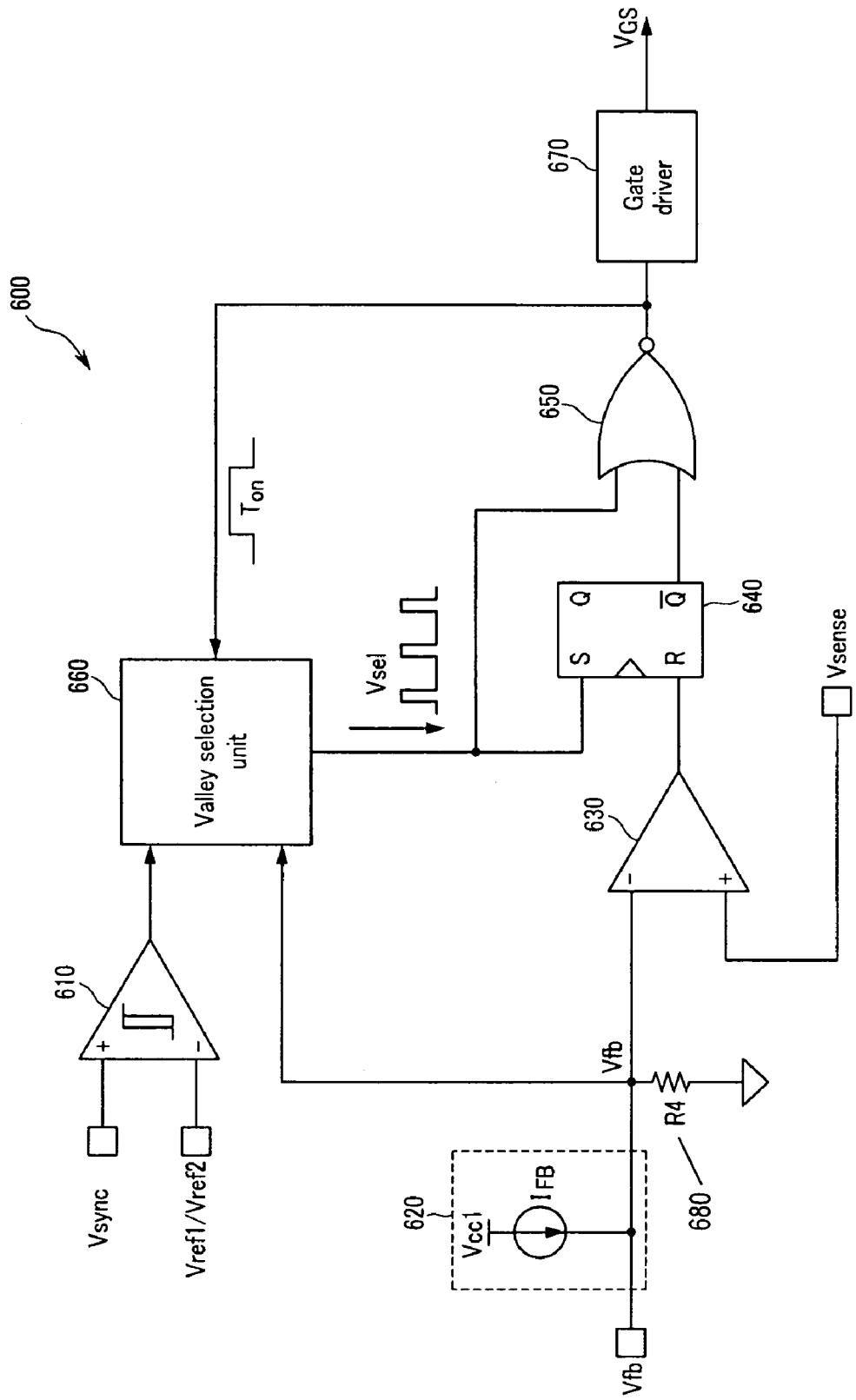
FIG. 5 is a schematic circuit diagram of an PWM signal generator 600.

FIG. 5 is a schematic circuit diagram of an embodiment of the PWM signal generator 600. The PWM signal generator 600 may include a comparator 610, a constant current supply block 620, a comparator 630, an SR flip-flop 640, a NOR gate 650, a valley selector 660, and a gate driver 670. The comparator 610 can be implemented as a Schmidt trigger.

The comparator 610 can receive the sync voltage Vsync through a non-inverting terminal (+), and reference voltages Vref1 and Vref2 through an inverting terminal (−). The comparator 610 may perform a logical operation on the input voltages and transmit a signal corresponding to the result of the logical operation to the valley selector 660. The reference voltages Vref1 are Vref2 can be voltages predetermined by a circuit designer. For example, the reference voltage Vref2 can be set higher than the reference voltage Vref1. The comparator 610 can output a high level signal if the sync voltage Vsync is higher than the reference voltage Vref2, and output a low level signal if the sync voltage Vsync is lower than the reference voltage Vref1. If the sync voltage Vsync is higher than the reference voltage Vref1 but lower than the reference voltage Vref2, the comparator 610 can maintain its previous output signal.

The constant current supply block 620 may include a current source IFB having a first terminal connected to a voltage source Vcc1 and a second terminal connected to the feedback circuit block 500 and an inverting terminal (−) of the comparator 630. The current generator IFB may be a constant current source, and the current flowing from the current source IFB to the feedback circuit block 500 can be inversely proportional to the feedback voltage Vfb, wherein the current flowing to ground through a resistor (R4) 680 is proportional to the feedback voltage Vfb. The voltage across the resistor (R4) 680 can be equal to the feedback voltage Vfb.

The comparator 630 can receive the sense signal Vsense voltage through the non-inverting terminal (+) and the feedback voltage Vfb through the inverting terminal (−). The comparator 630 may perform a logical operation on the input voltages and transmit a signal corresponding to the result of the logical operation to a reset terminal R of the SR flip-flop 640.

The SR flip-flop 640 can receive a valley selection signal at a set terminal S and the output signal of the comparator 630 at the reset terminal R. The flip-flop 640 may perform a logical operation on the input signals and transmit a signal corresponding to the result of the logical operation at the inverting output terminal (/Q) to an input terminal of the NOR gate 650.

The NOR gate 650 can receive a valley selection signal at a first input terminal and the output signal of the inverting output terminal (/Q) of the SR flip-flop 640 at a second input terminal. The NOR gate may perform a logical operation on the input signals and transmit a signal corresponding to the result of the logical operation to the gate driver 670.

The valley selector 660 can receive the feedback voltage Vfb, the output signal of the comparator 610, and the output signal of the NOR gate 650. The valley selector 660 may generate a valley selection signal according to the input signals, and transmit the valley selection signal to the set terminal S of the SR flip-flop 640 and the first input terminal of the NOR gate 650.

The gate driver 670 can generate a high level gate control signal $V_{GS}$ if the output signal of the NOR gate 650 is a high level and a low level gate control signal $V_{GS}$ if the output signal of the NOR gate 650 is a low level, and transmit the gate control signal $V_{GS}$ to the gate of the switching transistor 140 to control switching of the transistor.

Figure 6:
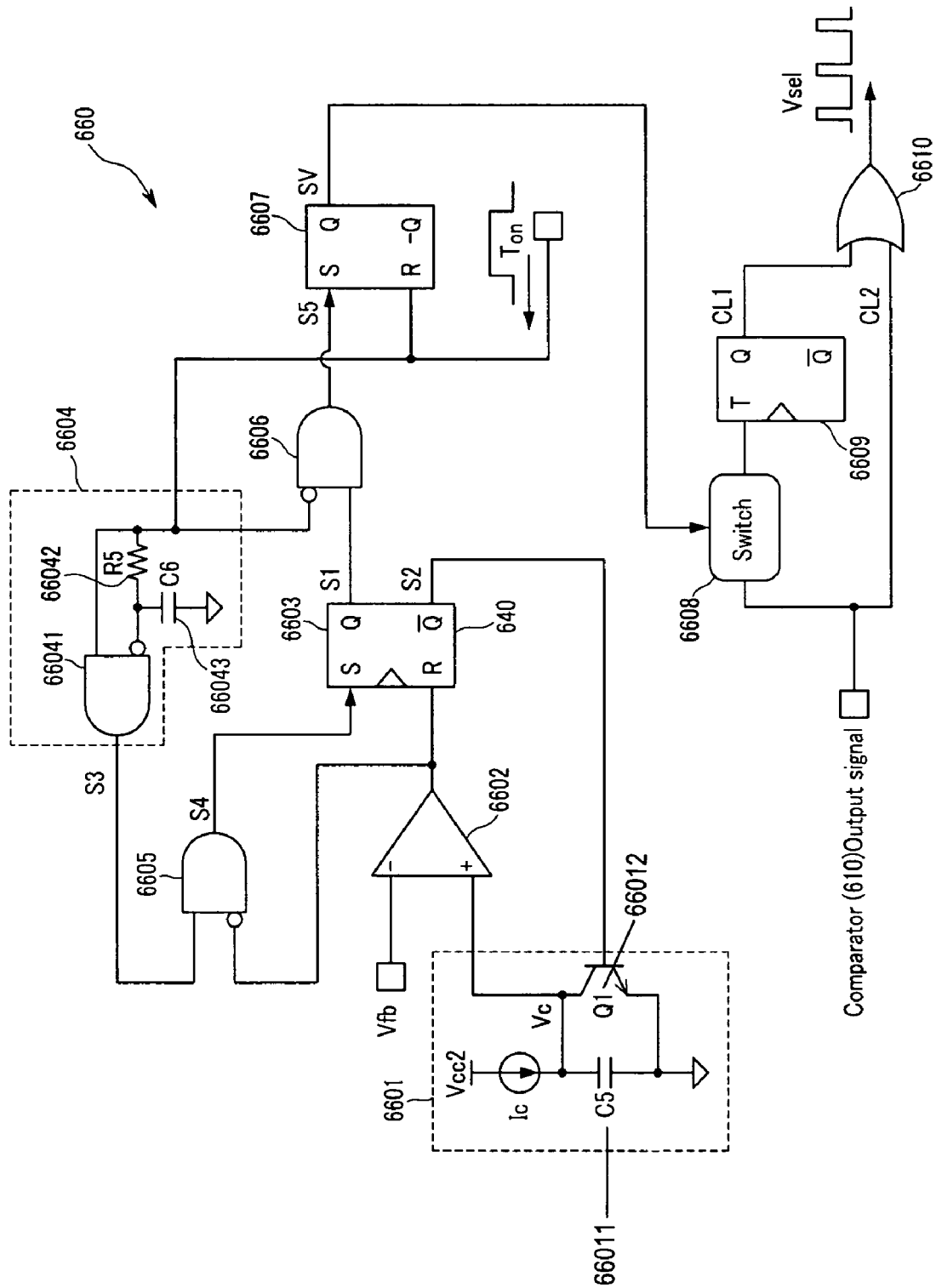
FIG. 6 is a schematic circuit diagram of an exemplary valley selector 660.

FIG. 6 is a schematic circuit diagram of a valley selector 660. The valley selector 660 may include a Vc voltage generator 6601, a comparator 6602, an SR flip-flop 6603, a one-shot vibrator 6604, AND gates 6605 and 6606, an SR flip-flop 6607, a switch 6608, a T flip-flop 6609, and an OR gate 6610.

The Vc voltage generator 6601 may include a current source Ic connected to a voltage source Vcc2, a capacitor (C5) 66011 having a first terminal connected to the current source Ic and a second terminal connected to ground, and a transistor (Q1) 66012. The transistor 66012 can be implemented as a BJT. The transistor 66012 can have a collector connected to the first terminal of the capacitor 66011 and to the non-inverting terminal (+) of the comparator, an emitter connected to ground, and a base connected to the inverting output terminal (/Q) of the SR flip-flop 6603. While the transistor 66012 is turned on, the current flowing from the current source Ic flows to ground through the transistor 66012, and no voltage is charged to the capacitor 66011. If the transistor 66012 is turned off, the current flowing from the current source Ic flows to the capacitor 66011, wherein the capacitor 66011 is charged to a voltage Vc. Accordingly, the Vc voltage generator 6601 can supply a Vc voltage corresponding to the turn-on/off times of the transistor 66012 to the non-inverting terminal (+) of the comparator 6602.

The comparator 6602 can receive the Vc voltage at the non-inverting terminal (+) and the feedback voltage Vfb at the inverting terminal (−). The comparator 6602 may perform a logical operation on the input voltages and transmit a signal corresponding to the result of the logical operation to the reset terminal R of the SR flip-flop 6603.

The SR flip-flop 6603 can receive an output signal S4 of the AND gate 6605 at the set terminal S and the output signal of the comparator 6602 at the reset terminal R. The SR flip-flop 6603 may perform a logical operation on the input signals, transmit a signal S1 corresponding to the result of the logical operation at the output terminal Q to a first input terminal of the AND gate 6606, and transmit a signal S2 at the inverting output terminal (/Q) to the control terminal of the transistor 66012.

The one-shot vibrator 6604 may include an AND gate 66041 driven by the output signal of the NOR gate 650, a resistor (R5) 66042, and a capacitor (C6) 66043. The one-shot vibrator 6604 can transmit a signal S3 corresponding to the output signal of the NOR gate 650 through the AND gate 66041 to the AND gate 6605. The S3 signal can change to a high level at a rising edge of the output signal of NOR gate 650, and it can change to a low level after sustaining a high level for a predetermined time.

The AND gate 6605 can receive the S3 signal at a first input terminal and the output signal of the comparator 6602 at a second inverted input terminal. The AND gate 6605 may perform a logical operation on the input signals and transmit a signal S4 corresponding to the result of the logical operation to the set terminal S of the SR flip-flop 6603.

The AND gate 6606 can receive the inverted output signal of the NOR gate 650 at a first input terminal and the S1 signal at a second input terminal. The AND gate 6606 may perform a logical operation on the input signals and transmit a signal S5 corresponding to the result of the logical operation to the set terminal S of the SR flip-flop 6607.

The SR flip-flop 6607 can receive the S5 signal at the set terminal S and the output signal of the NOR gate 650 at the reset terminal R. The SR flip-flop 6607 may perform a logical operation on the input signals and transmit a signal SV corresponding to the result of the logical operation at the output terminal Q to turn on/off the switch 6608.

The switch 6608 can selectively supply an output signal of the comparator 610 to the T flip-flop 6609. In detail, if the SV signal of the SR flip-flop 6607 is at a high level, the switch 6608 can be turned on, and if the SV signal is at a low level, the switch 6608 can be turned off.

The T flip-flop 6609 may receive an output signal of the comparator 610 when the switch 6608 is turned on to output a signal CL1 at its non-inverting output terminal Q. If the output signal of the comparator 610 is at a high level, the CL1 signal becomes an inverted signal of the previous state, and if an output signal of the comparator 610 is at a low level, the CL1 signal remains in the previous state. Further, if the switch 6608 is turned off, the CL1 signal remains in the previous state before the switch 6608 was turned off.

The OR gate 6610 can receive the CL1 signal at a first input terminal and the output signal of the comparator 610 at a second input terminal. The OR gate may perform a logical operation on the input signals and transmit a valley selection signal Vsel corresponding to the result of the logical operation to the first input terminal of the NOR gate 650.

The PWM signal generator 600 shown in FIG. 5 may determine the turn-on/off times of the switching transistor 140 using the Vsel signal output from the valley selector 660 shown in FIG. 6 as follows.

Equation 1 represents a relationship between the maximum value (Ipk) of the switching current and the time Ton during which the switching transistor 140 maintains an ON state.

$$I_{pk} = \frac{V_{in}}{L_m} T_{on} \quad (1)$$

where Lm is the inductance of the primary coil L1 of a transformer.

The time Ton during which the switching transistor 140 maintains an ON state can be proportional to the feedback voltage Vfb. Accordingly, the Ipk can be proportional to the feedback voltage Vfb.

The valley selector 660 can set the S1 signal to maintain a high level for a predetermined period of time in proportion to the Ipk from a time in which the $V_{GS}$ signal becomes a high level, i.e., the time in which the switching transistor 140 is turned on. A time $Ton^{TH}$ in which the S1 signal maintains a high level can be represented as:

$$T_{on}^{TH} = K \cdot I_{pk} \quad (2)$$

where K is a constant.

If the time Ton in which the $V_{GS}$ signal maintains a high is shorter than the $Ton^{TH}$, the valley selector 660 can output a valley selection signal Vsel for turning on the switching transistor 140 at the minimum of a minimum of a first valley of the Vds voltage. If the Ton is longer than the $Ton^{TH}$, the valley selector 660 can output a valley selection signal Vsel for turning on the switching transistor 140 at the minimum of a second valley of the Vds voltage.

The condition that the Ton is shorter than the $Ton^{TH}$ can be expressed using Equations 1 and 2 as:

$$\frac{L_m}{K} < V_{in} \quad (3)$$

As Lm and K are predetermined values, the PWM signal generator 600 can turn on the switching transistor 140 at the minimum of a first valley of the Vds voltage if the input voltage Vin is lower than a predetermined level set by the Lm and K values. If the Ton is longer than the $Ton^{TH}$, i.e., if the input voltage Vin is higher than a predetermined level set by the Lm and K values, the PWM signal generator 600 turns on the switching transistor 140 at a minimum of a second valley of the Vds voltage.

Visibly, the PWM signal generator 600 can vary a turn-on time of the switching transistor 140 according to the input voltage Vin. However, the PWM signal generator 600 can determine a turn-on time of the switching transistor 140 by comparing the time Ton during which the $V_{GS}$ signal maintains a high level with the time $Ton^{TH}$ during which the S1 signal maintains a high level, without directly sensing the input voltage Vin. Hereinafter, selection of a turn-on time of the switching transistor 140 corresponding to the input voltage Vin and the Po of the PWM signal generator 600 will be described with reference to FIGS. 7 and 8.

Figure 7:
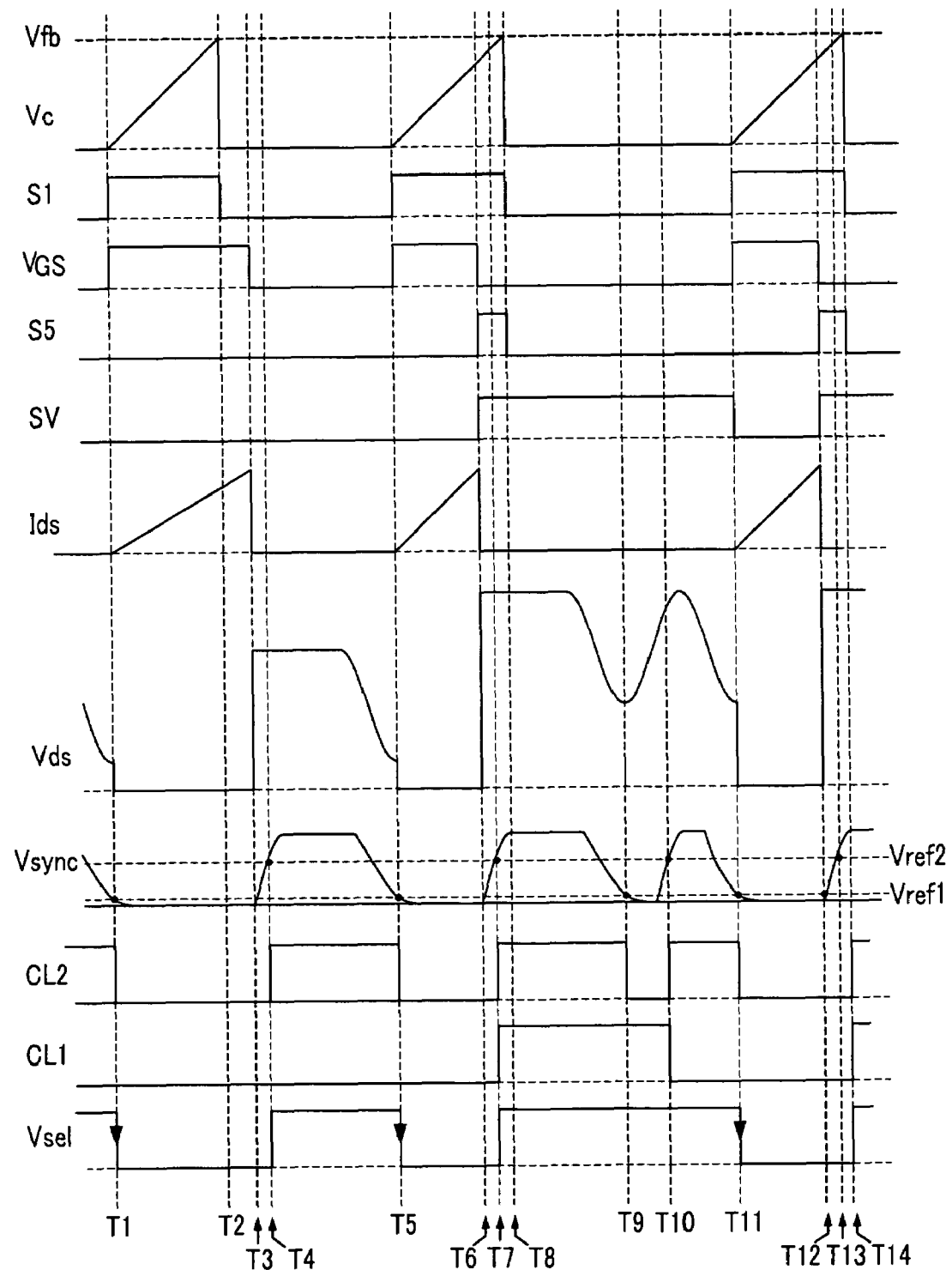
FIG. 7 is a diagram illustrating an operation of an exemplary valley selector 660 as an input voltage Vin rises.

FIG. 7 is a diagram illustrating an operation of an embodiment of the valley selector 660 as an input voltage Vin rises.

At a time T1, when the sync voltage Vsync falls to a voltage lower than the reference voltage Vref1, the output signal CL2 of the comparator 610 can change to a low level. In this case, because the SV signal maintains a low level, the CL1 signal maintains a low level, and the Vsel signal changes to a low level.

When the Vsel signal changes to a low level, the output signal of the inverting output terminal (/Q) of the SR flip-flop 640 can maintain a low level, and the $V_{GS}$ signal can change to a high level. Accordingly, the S3 signal input to the set terminal S of the SR flip-flop 6603 also changes from a low level to a high level, and the S1 signal becomes a high level and the S2 signal becomes a low level. As the S2 signal changes to a low level, the transistor 66012 of the Vc voltage generator 6601 turns off, and the Vc voltage of capacitor 66011 increases. As the $V_{GS}$ signal changes to a high level, the switching transistor 140 turns on, the current Ids gradually increases, and the sync voltage Vsync and the drain-source voltage Vds of the switching transistor become 0.

As the S5 signal input to the set terminal S of the SR flip-flop 6607 maintains a low level, the SV signal maintains a low level, and the CL1 signal maintains a low level. Further, because the sync voltage Vsync is 0, the CL2 signal becomes a low level and the Vsel signal also becomes a low level. Further, in the SR flip-flop 640, the Vsel signal, which is an input signal of the set terminal S, changes to a low level. However, the input signal of the reset terminal R maintains a low level, thus the output signal of the inversion output terminal (/Q) of the SR flip-flop 640 still maintains a low level. Accordingly, the $V_{GS}$ signal maintains a high level.

The S3 signal changes to a low level after maintaining a high level only during a predetermined time from when the $V_{GS}$ signal changes to a high level. Thus, the S4 signal also changes from a high level to a low level. However, when the S3 and S4 signal change, the S1 and S2 signals maintain a high level and a low level, respectively, and the S5, SV, and CL1 signals do not change. Accordingly, the $V_{GS}$ signal also maintains a high level.

At a time T2, as the Vc voltage that starts to increase from the time T1 reaches a Vfb voltage, the output signal of the comparator 6602 changes to a high level, the S1 signal changes to a low level, and the S2 signal changes to a high level. If the S2 signal changes to a high level, the output signal of the comparator 6602 changes to a low level. However, the S1 and S2 signals maintain a low level and a high level, respectively. Accordingly, when the S1 signal changes, the S5 signal does not change, and the SV and CL1 signals do not change. Accordingly, the $V_{GS}$ signal maintains a high level.

At a time T3, as the Ids that starts to increase from the time T1 reaches a predetermined level, the Vsense voltage becomes higher than the feedback voltage Vfb, and the output signal of the comparator 630 changes to a high level. Thus, the output signal of the inversion output terminal (/Q) of the SR flip-flop 640 changes from a low level to a high level. Accordingly, the $V_{GS}$ signal changes from a high level to a low level, and the switching transistor 140 turns off. When the switching transistor 140 turns off, the Ids and the Vsense voltage become 0, and the comparator 630 outputs a low level signal. Accordingly, the output signal of the inversion output terminal (/Q) of the SR flip-flop 640 maintains a high level, and the S1 to S5 signal do not change. As the switching transistor 140 turns off, a Vds voltage is generated, and the sync voltage Vsync starts to increase according to the Vds voltage.

At a time T4, the sync voltage Vsync that starts to increase from the time T3 becomes higher than the reference voltage Vref2. As the sync voltage Vsync becomes higher than a reference voltage Vref2, the output signal CL2 signal of the comparator 610 changes to a high level. As the SV signal is still at a low level, the switch 6608 is off, and the CL1 signal still sustains a low level. As the CL2 signal changes to a high level, the Vsel signal that is input to the set terminal S of the SR flip-flop 640 changes to a high level, and the output signal of the inverting output terminal (/Q) of the SR flip-flop 640 changes to a low level. Accordingly, the $V_{GS}$ signal maintains a low level.

At a time T5, the Vds voltage is at a minimum of a first valley and the sync voltage Vsync falls to a voltage that is lower than a reference voltage Vref1. Thus, the output signal CL2 of the comparator 610 changes to a low level, the Vsel signal changes to a low level, and the output signal of the inverting output terminal (/Q) of the SR flip-flop 640 changes to a high level. Accordingly, the $V_{GS}$ signal changes to a high level and the switching transistor 140 turns on. As the $V_{GS}$ signal changes to a high level, the S3 and S4 signal change to a high level, the S1 signal changed to a high level, and the S2 signal changes to a low level. Accordingly, the S5 signal and the SV signal maintain a low level.

The S3 signal changes to a low level after maintaining a high level for a predetermined time from when the $V_{GS}$ signal changes to a high level, and the S4 signal also changes from a high level to a low level. However, when the S3 and S4 signal change, the S1 and S2 signals maintain a high level and a low level, respectively, and the S5, SV, and CL1 signals do not change. Accordingly, because the CL2 signal is at a low level, the Vsel signal becomes a low level. However, as both the output signal of the comparator 610 and the output signal of the inverting output terminal (/Q) of the SR flip-flop 640 become a low level, the $V_{GS}$ signal maintains a high level. As the switching transistor 140 turns on, the current Ids gradually increases, and the sync voltage Vsync and the drain-source voltage Vds of the switching transistor 140 become 0. Accordingly, due to an increase of the input voltage Vin, the current Ids rises with a slope greater than at the time T1.

At a time T6, as the current Ids that starts to increase from the time T5 reaches a predetermined level, the Vsense voltage becomes higher than the feedback voltage Vfb, and the output signal of the comparator 630 and the output signal of the inverting output terminal (/Q) of the SR flip-flop 640 change from a low level to a high level. Accordingly, the $V_{GS}$ signal changes from a high level to a low level and the switching transistor 140 turns off. As the $V_{GS}$ signal changes to a low level, all signals that are input to the first and second input terminals of the AND gate 6606 change to a high level. In this case, the input signal at the first input terminal of the AND gate 6606 directly changes to a high level while the S1 signal input at the second input terminal of the AND gate 6606 changes to a high level later due to a signal delay time through the one-shot vibrator 6604, the AND gate 6605, and the SR flip-flop 6603. Accordingly, at the time at which the $V_{GS}$ signal changes to a low level, the S5 signal, which is an output signal of the AND gate 6605, changes to a high level after temporarily maintaining a low level, and the SV signal changes to a high level. When the SV signal changes to a high level, the output signal of the comparator 610 is at a low level, and the CL1 signal, the CL2 signal, and the Vsel signal maintain a low level. As the switching transistor 140 turns off, the Ids and the Vsense voltage become 0, and the output signal of the comparator 630 changes to a low level. However, the output signal of the inverting output terminal (/Q) of the SR flip-flop 640 maintains a high level. Further, as the switching transistor 140 turns off, a Vds voltage is generated, and a sync voltage Vsync starts to increase according to the Vds voltage.

At a time T7, the sync voltage Vsync that started to increase from the time T6 becomes higher than a reference voltage Vref2. As the sync voltage Vsync becomes higher than the reference voltage Vref2, the output signal CL2 signal of the comparator 610 changes to a high level. Accordingly, as the SV signal is at a high level, the switch 6608 is in an ON-state, and the CL1 signal changes to a high level. As the CL1 and CL2 signals change to a high level, the Vsel signal that is input to the set terminal S of the SR flip-flop 640 changes to a high level, and the output signal of the inverting output terminal (/Q) of the SR flip-flop 640 changes to a low level. Accordingly, the $V_{GS}$ signal maintains a low level.

At a time T8, as the Vc voltage that starts to increase from the time T5 reaches a Vfb voltage, the output signal of the comparator 6602 changes to a high level, the S1 signal changes to a low level, and the S2 signal changes to a high level. When the S2 signal changes to a high level, the output signal of the comparator 6602 changes to a low level. When the S1 signal changes to a low level, the S5 signal changes to a low level, and the SV signal maintains a high level. Thus, the CL1 and Vsel signals maintain a high level, and the $V_{GS}$ signal maintains a low level.

At a time T9, the Vds voltage is at a minimum of a first valley and the sync voltage Vsync falls to a voltage lower than the reference voltage Vref1. Thus, the output signal CL2 of the comparator 610 changes to a low level. As the SV signal is at a high level and the CL2 signal is at a low level, the CL1 signal maintains a high level. Accordingly, the Vsel signal maintains a high level and the $V_{GS}$ signal maintains a low level.

At a time T10, the sync voltage Vsync rises to a higher voltage than the reference voltage Vref2 as the Vds voltage rises due to resonance. As the sync voltage Vsync becomes higher than the reference voltage Vref2, the output signal CL2 of the comparator 610 changes to a high level. As the SV signal is at a high level, the CL1 signal becomes a low level by inverting an output signal in a previous state, and the Vsel signal maintains a high level. Accordingly, the $V_{GS}$ signal maintains a low level.

At a time T11, the Vds voltage is at a minimum of a second valley, the sync voltage Vsync falls to a lower voltage than the reference voltage Vref1, and the output signal CL2 of the comparator 610 changes to a low level. Accordingly, the CL1 signal maintains a low level and the Vsel signal changes to a low level. Even though the Vsel signal changes to a low level, the output signal of the inversion output terminal (/Q) of the SR flip-flop 640 maintains a low level. Thus, the $V_{GS}$ signal changes to a high level, and the switching transistor 140 turns on. As the $V_{GS}$ signal changes to a high level, the S3 and S4 signal change to a high level, the S1 signal changes to a high level, and the S2 signal changes to a low level. As the S2 signal changes to a low level, the transistor 66012 of the Vc voltage generator 6601 turns off, and the voltage Vc charged to the capacitor 66011 increases. As the switching transistor 140 turns on, the Ids gradually increases, and the sync voltage Vsync and the drain-source voltage Vds of the switching transistor 140 become 0. Accordingly, the current Ids rises with a slope greater than at time T5 due to the rise of the input voltage Vin.

In this case, the S5 signal maintains a low level, the SV signal changes to a low level, and the CL1 signal maintains a low level. As the sync voltage Vsync is 0, the CL2 signal and the Vsel signal also become a low level. Further, the Vsel signal input at the set terminal S of the SR flip-flop 640 changes to a low level, the input signal of the reset terminal R of the SR flip-flop 640 maintains a low level, and the output signal of the inverting output terminal (/Q) of the SR flip-flop 640 still maintains a low level. Accordingly, the $V_{GS}$ signal maintains a high level.

The S3 signal changes to a low level after maintaining a high level for a predetermined time when the $V_{GS}$ signal changes to a high level, and the S4 signal also changes from a high level to a low level. However, when the S3 and S4 signal change, the S1 signal and the S2 signal maintain a high level and a low level, respectively, and the S5, SV, and CL1 signals do not changed such that the $V_{GS}$ signal also maintains a high level.

At a time T12, the operation of the valley selector 660 is repeated from time T6.

As shown in FIG. 7, as the input voltage Vin rises, the rising slope of the Ids increases, and the period Ton in which the $V_{GS}$ signal maintains a high level gradually shortens. As the feedback voltage Vfb is uniformly maintained, the period $Ton^{TH}$ in which the S1 signal maintains a high level is uniformly maintained, and the turn-on/off times of the switching transistor 140 can be changed according to the input voltage Vin.

The PWM signal generator 600 changes the S1 signal to a high level when the $V_{GS}$ signal changes to a high level. After the S1 signal changes to a low level, if the $V_{GS}$ signal changes to a low level, the minimum of a first valley of the Vds voltage turns on the switching transistor 140. In contrast, the PWM signal generator 600 can immediately turn on the switching transistor 140 at the minimum of a first valley of the Vds voltage if the $V_{GS}$ signal changes to a low level before the S1 signal changes to a low level.

The SMPS can operate stably within the voltage range in which typical TVs and high definition HDTVs are driven. Accordingly, unlike the conventional quasi-resonant SMPS, when the turn-on time of the switching transistor 140 changes, no ripple is generated in the output voltage Vo of the SMPS. Thus, HDTVs can be operated with negligible screen noise.

Embodiments of the SMPS turn on the switching transistor 140 at the minimum of a second valley of the Vds voltage when the input voltage Vin is high to prevent an increase of the input power limit $Pin^{Lim}$ due to the switching frequency fs increasing in proportion to the input voltage Vin. This is described with reference to FIG. 8.

Figure 8:
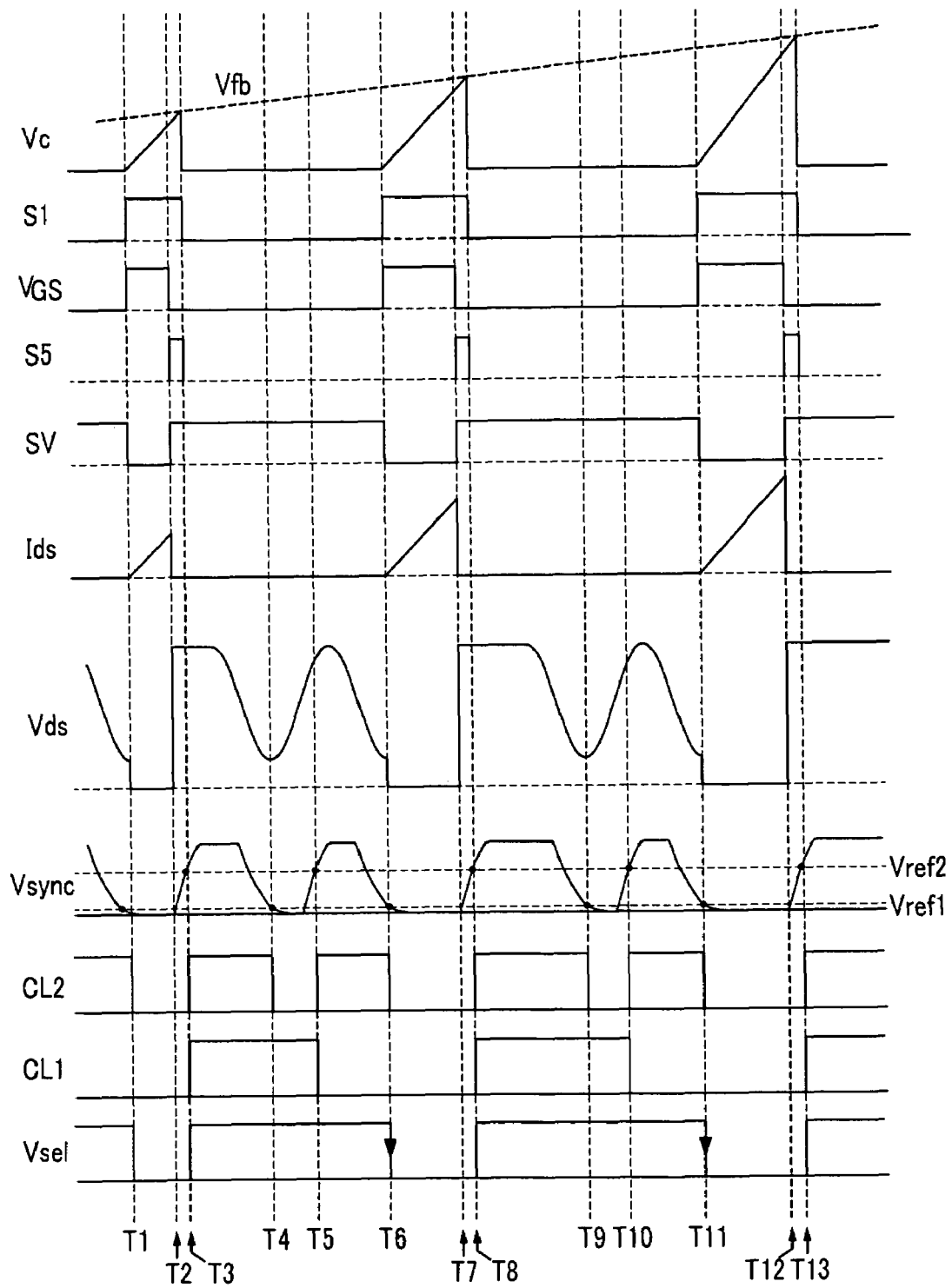
FIG. 8 is a diagram illustrating an operation of an exemplary valley selector 660 as an output power Po increases when an input voltage Vin is high.

FIG. 8 is a diagram illustrating an operation of a valley selector 660 as the output power Po increases when an input voltage Vin is high.

At a time T1, the sync voltage Vsync falls to a voltage lower than the reference voltage Vref1 and the output signal CL2 signal of the comparator 610 changes to a low level. Accordingly, the SV signal changes to a low level, the CL1 signal maintains a low level and the Vsel signal changes to a low level.

When the Vsel signal changes to a low level, the output signal of the inversion output terminal (/Q) of the SR flip-flop 640 maintains a low level, and the $V_{GS}$ signal changes to a high level to turn on the switching transistor 140. As the $V_{GS}$ signal changes to a high level, the S3 and S4 signal change to a high level. Thus, the S1 signal changes to a high level while the S2 signal changes to a low level. As the S2 signal changes to a low level, the transistor 66012 of the Vc voltage generator 6601 turns off, and voltage Vc charged to the capacitor C5 increases. As the switching transistor 140 turns on, the Ids gradually increases, and the sync voltage Vsync and the drain-source voltage Vds of the switching transistor 140 become 0.

In this case, the S5 signal maintains a low level while the SV signal changes to a low level and the CL1 signal maintains a low level. Further, because the sync voltage Vsync is 0, the CL2 signal and the Vsel signal also become a low level. Further, in the SR flip-flop 640, the Vsel signal, which is an input signal of the set terminal S, changes to a low level, but the input signal of the reset terminal R maintains a low level such that output signal of the inverting output terminal (/Q) of the SR flip-flop 640 maintains a low level. Accordingly, the $V_{GS}$ signal maintains a high level.

The S3 signal changes to a low level after maintaining a high level for a predetermined time from when the $V_{GS}$ signal changes to a high level, and thus the S4 signal also changes from a high level to a low level. However, when the S3 and S4 signals change, the S1 and S2 signals maintain a high level and a low level, respectively, and the S5, SV, and CL1 signals do not change. Accordingly, the $V_{GS}$ signal also maintains a high level.

At a time T2, when the Ids that started to increase at time T1 reaches a predetermined level, the Vsense voltage becomes higher than the feedback voltage Vfb, and the output signal of the comparator 630 and the output signal of the inverting output terminal (/Q) of the SR flip-flop 640 change from a low level to a high level. Accordingly, the $V_{GS}$ signal changes from a high level to a low level, and the switching transistor 140 turns off. As the $V_{GS}$ signal changes to a low level, all signals that are input to the first input terminal and the second input terminal of the AND gate 6606 change to a high level. In this case, the input signal of the first input terminal of the AND gate 6606 directly changes to a high level while the S1 signal that is input to the second input terminal of the AND gate 6606 changes to a high level later than the input signal of the first input terminal due to a signal delay time through the one-shot vibrator 6604, the AND gate 6605, and the SR flip-flop 6603. Accordingly, when the $V_{GS}$ signal changes to a low level, the S5 signal, which is an output signal of the AND gate 6605, changes to a high level after temporarily maintaining a low level, and the SV signal changes to a high level. When the SV signal changes to a high level, the output signal of the comparator 610 is at a low level, and the CL1 signal, CL2 signal, and Vsel signal all maintain a low level. As the switching transistor 140 turns off, the Ids and the Vsense voltage become 0 and the output signal of the comparator 630 changes to a low level while the output signal of the inverting output terminal (/Q) of the SR flip-flop 640 maintains a high level. Further, as the switching transistor 140 turns off, a Vds voltage is generated, and the sync voltage Vsync starts to increase according to the Vds voltage.

At a time T3, as the Vc voltage that started to increase at time T1 reaches the Vfb voltage, the output signal of the comparator 6602 changes to a high level, the S1 signal changes to a low level, and the S2 signal changes to a high level. As the S2 signal changes to a high level, the output signal of the comparator 6602 changes to a low level. As the S1 signal changes to a low level, the S5 signal changes to a low level and the SV signal changes to a high level. Accordingly, as the output signal of the comparator 610 is at a high level, the CL1 signal, CL2 signal, and Vsel signal all change to a high level, and the $V_{GS}$ signal maintains a low level.

At a time T4 time point at a minimum of a first valley of the Vds voltage, the sync voltage Vsync falls to a voltage lower than the reference voltage Vref1 and the output signal CL2 signal of the comparator 610 changes to a low level. As the SV signal is at a high level and the CL2 signal is at a low level, the CL1 signal maintains a high level, and the Vsel signal maintains a high level. Accordingly, the $V_{GS}$ signal maintains a low level.

At a time T5 at which the sync voltage Vsync rises to a voltage higher than the reference voltage Vref2, the Vds voltage rises due to resonance. As the sync voltage Vsync becomes higher than the reference voltage Vref2, the output signal CL2 signal of the comparator 610 changes to a high level. As the SV signal is at a high level, the CL1 signal becomes a low level by inverting the output signal, and the Vsel signal maintains a high level. Accordingly, the $V_{GS}$ signal maintains a low level.

At a time T6 at a minimum of a second valley of the Vds voltage, the sync voltage Vsync falls to a voltage lower than a reference voltage Vref1 and the output signal CL2 of the comparator 610 changes to a low level. Thus, the CL1 signal maintains a low level and the Vsel signal changes to a low level. When the Vsel signal changes to a low level, the output signal of the inverting output terminal (/Q) of the SR flip-flop 640 maintains a low level and the $V_{GS}$ signal changes to a high level to turn on the switching transistor 140. As the $V_{GS}$ signal changes to a high level, the S3 and S4 signals change to a high level, the S1 signal changes to a high level, and the S2 signal changes to a low level. As the S2 signal changes to a low level, the transistor 66012 of the Vc voltage generator 6601 turns off, and the voltage Vc charged to the capacitor C5 increases. As the switching transistor 140 turns on, the Ids gradually increases, and the sync voltage Vsync and the drain-source voltage Vds of the switching transistor 140 become 0.

In this case, the S5 signal maintains a low level while the SV signal changes to a low level and the CL1 signal maintains a low level. Further, because the sync voltage Vsync is 0, the CL2 signal and Vsel signal also become a low level. Further, in the SR flip-flop 640, the Vsel signal changes to a low level while the input signal of the reset terminal R maintains a low level, and the output signal of the inverting output terminal (/Q) of the SR flip-flop 640 maintains a low level. Accordingly, the $V_{GS}$ signal maintains a high level.

The S3 signal changes to a low level after maintaining a high level for a predetermined time from when the $V_{GS}$ signal changes to a high level. Thus, the S4 signal also changes from a high level to a low level. However, when the S3 and S4 signals change, the S1 and S2 signals maintain a high level and a low level, respectively, and the S5, SV, CL1 signals do not change. Accordingly, the $V_{GS}$ signal maintains a high level.

At a time T7 when the Ids that starts to increase from time T6 time reaches a predetermined level, the Vsense voltage becomes higher than the feedback voltage Vfb, and the output signal of the comparator 630 and the output signal of the inverting output terminal (/Q) of the SR flip-flop 640 changes from a low level to a high level. Thus, the $V_{GS}$ signal changes from a high level to a low level and the switching transistor 140 turns off. As the $V_{GS}$ signal changed to a low level, all signals that are input to the first input terminal and the second input terminal of the AND gate 6606 change to a high level. In this case, the input signal of the first input terminal of the AND gate 6606 directly changes to a high level while the S1 signal that is input to the second input terminal of the AND gate 6606 changes to a high level later than the first input terminal input signal due to a signal delay time through the one-shot vibrator 6604, AND gate 6605, and SR flip-flop 6603. Accordingly, when the $V_{GS}$ signal changes to a low level, the S5 signal changes to a high level after temporarily maintaining a low level, and the SV signal changes to a high level. When the SV signal changes to a high level, the output signal of the comparator 610 is at a low level, and the CL1 signal, CL2 signal, and Vsel signal all maintain a low level. As the switching transistor 140 turns off, the Ids and the Vsense voltage become 0, the output signal of the comparator 630 changes to a low level, and the output signal of the inverting output terminal (/Q) of the SR flip-flop 640 maintains a high level. Further, as the switching transistor 140 turns off, a Vds voltage is generated, and the sync voltage Vsync starts to increase according to the Vds voltage.

At a time T8, as the Vc voltage that starts to increase from time T6 reaches the Vfb voltage, the output signal of the comparator 6602 changes to a high level, the S1 signal changes to a low level, and the S2 signal changes to a high level. As the S2 signal changes to a high level, the output signal of the comparator 6602 changes to a low level. As the S1 signal changes to a low level, the S5 signal changes to a low level and the SV signal changes to a high level. Thus, as the output signal of the comparator 610 is at a high level, the CL1 signal, CL2 signal, and Vsel signal change to a high level. Accordingly, the $V_{GS}$ signal maintains a low level.

At a time T9, the operation of the described embodiment of the valley selector 660 is repeated from time T4.

As shown in FIG. 8, as the output power Po increases, the feedback voltage Vfb increases. Thus, the rising slope of the current Ids is uniformly maintained while the peak value Ipk of the Ids gradually rises. Accordingly, both the period Ton in which the $V_{GS}$ signal maintains a high level and the period $Ton^{TH}$ in which the S1 signal maintains a high level are gradually lengthened by the same ratio, and the turn-on/off time of the switching transistor 140 can be changed according to the input voltage Vin regardless of the output power Po.

An embodiment of the SMPS can turn on the switching transistor 140 at a minimum of a second valley of the Vds voltage when the input voltage Vin is high. Therefore, unlike a conventional SMPS, the input power limit $Pin^{Lim}$ does not increase due to the switching frequency fs increasing in proportion to the input voltage Vin in the exemplary SMPS. Accordingly, excessive stress on the switching transistor 140 can be reduced to enable stable operation.

Hereinafter, driving of a conventional quasi-resonant SMPS and driving of an embodiment of the present SMPS are compared, with reference to FIGS. 9 and 10.

Figure 3:
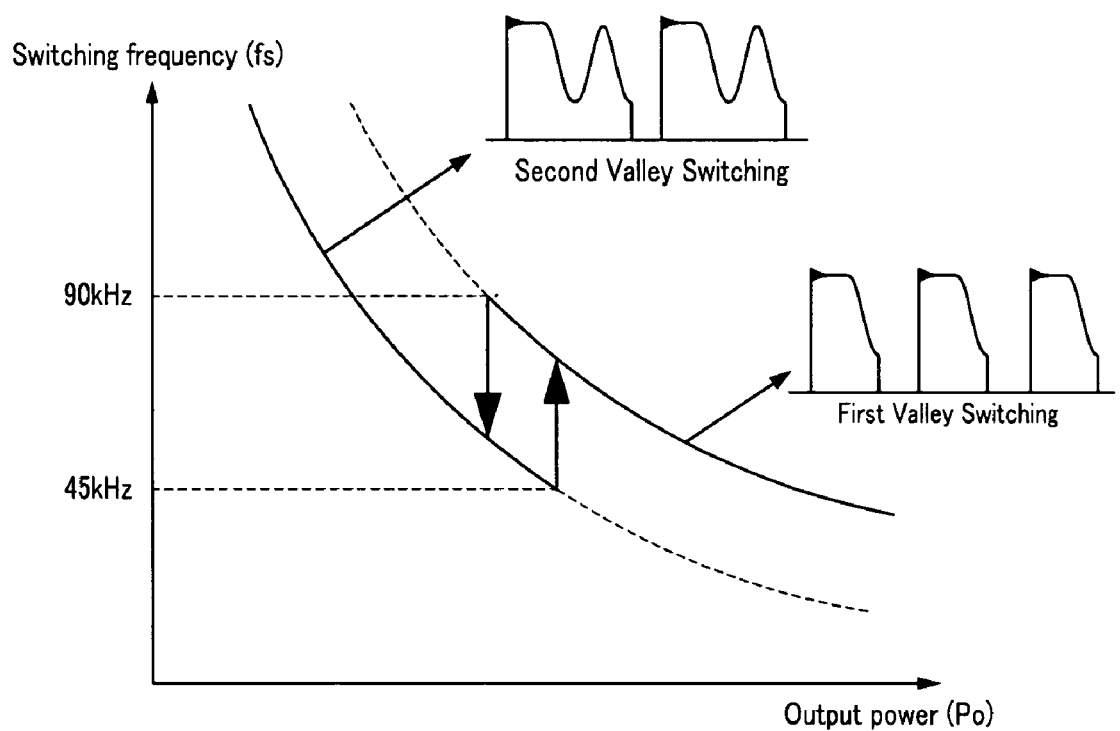
FIG. 3 illustrates the switching of the main switch of a conventional quasi-resonant SMPS at a minimum of a minimum of a first valley or minimum of a second valley of the Vds voltage, depending upon the output power Po and the switching frequency fs.
Figure 9:
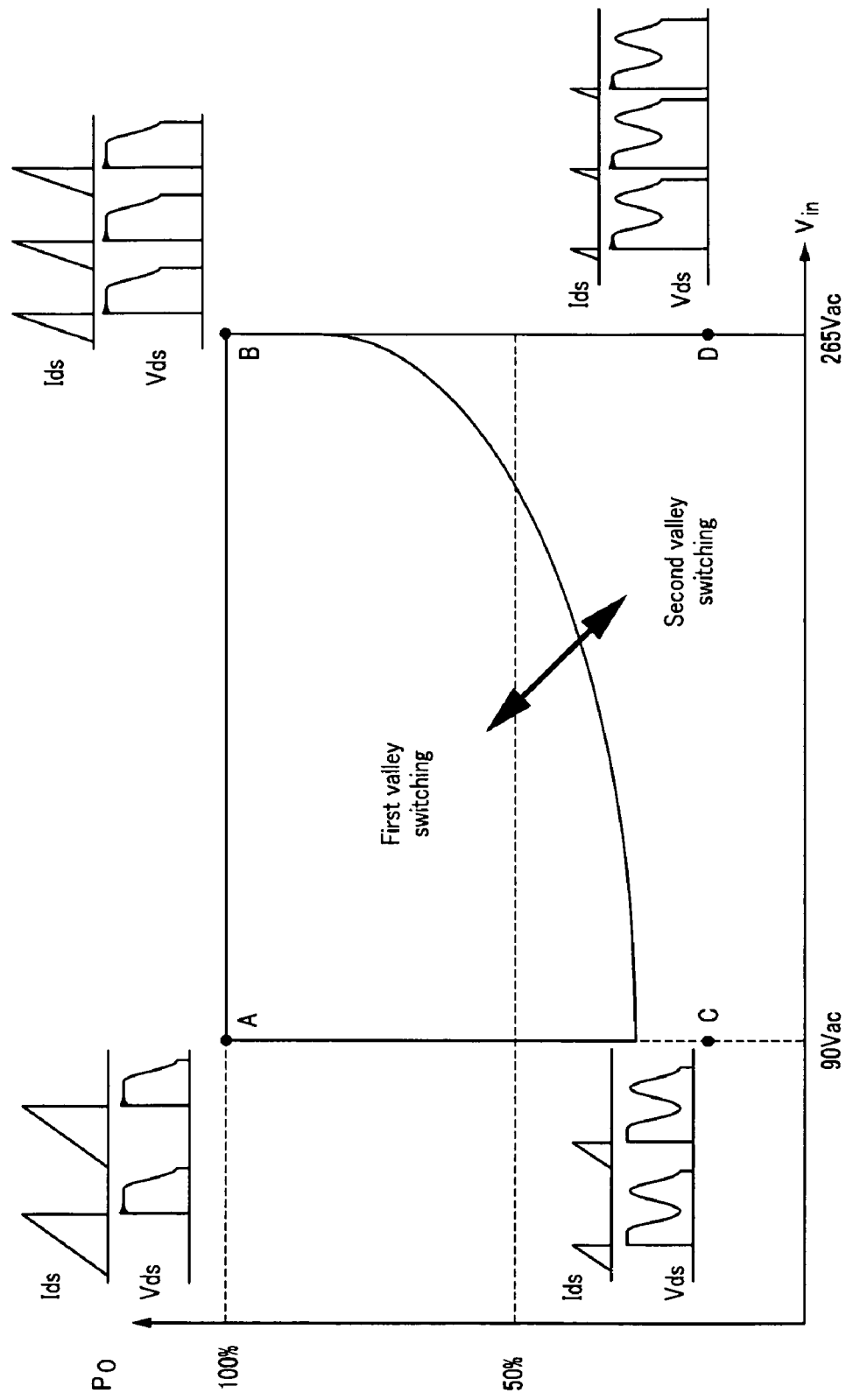
FIG. 9 is a diagram illustrating an operation of a conventional quasi-resonant SMPS shown in FIG. 3 as it turns on at a minimum of a minimum of a first valley or a minimum of a second valley of the drain-source voltage Vds of the switching transistor 140, according to an input voltage Vin and an output power Po.
Figure 10:
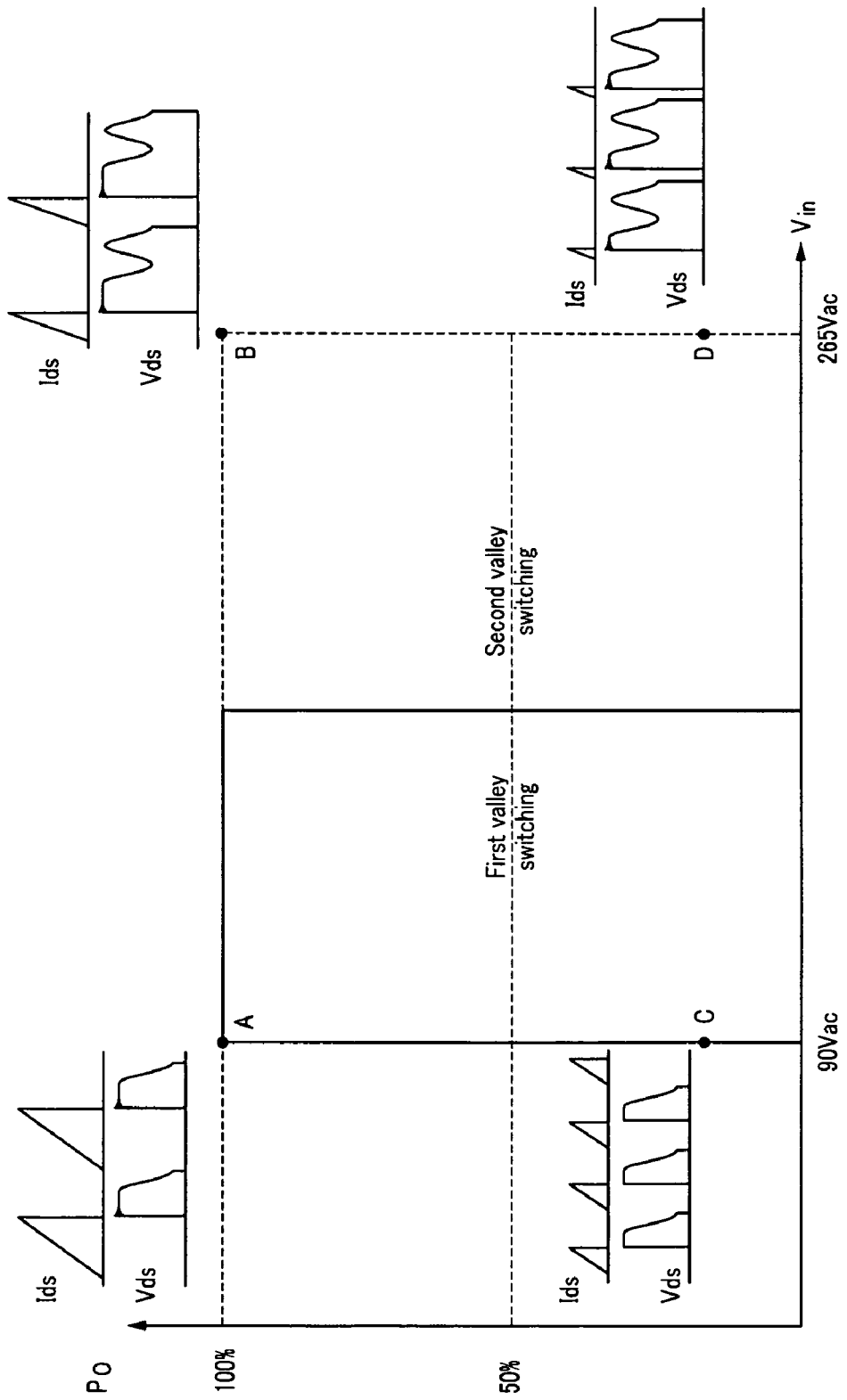
FIG. 10 is a diagram illustrating an operation of an exemplary SMPS according to an embodiment of the present invention as it turns on at a minimum of a minimum of a first valley or a minimum of a second valley of the drain-source voltage Vds of the switching transistor 140, according to an input voltage and an output power Po.

FIG. 9 is a diagram illustrating an operation of a conventional quasi-resonant SMPS shown in FIG. 3 as it turns on at a minimum of a first valley or a minimum of a second valley of the drain-source voltage Vds of the switching transistor 140, according to an input voltage Vin and the output power Po. FIG. 10 is a diagram illustrating an operation of an embodiment of the present SMPS as it turns on at a minimum of a first valley or a minimum of a second valley of the drain-source voltage Vds of the switching transistor 140, according to an input voltage and the output power Po.

Unlike the conventional SMPS, the embodiments of the present SMPS can turn on the switching transistor 140 at the minimum of a first valley or the minimum of a second valley of the Vds voltage depending on the input voltage Vin and essentially regardless of the output power Po.

The embodiments of the present SMPS can change the turn-on time of the switching transistor 140 according to the input voltage Vin essentially regardless of the output power. That is, the embodiments of the present SMPS can determine the turn-on time of the switching transistor 140 by comparing the time to maintain the $V_{GS}$ signal at a high level corresponding to the increasing slope of the Ids with a $Ton^{TH}$ corresponding to the peak value Ipk of the Ids without directly sensing the input voltage Vin. Accordingly, screen noise can be substantially reduced and stress on the switching transistor due to excessive power input can be reduced to enable an SMPS with stable operation.

Embodiments of the present SMPS can substantially reduce screen noise by determining the turn-on time of the switching transistor 140 according to an input voltage Vin regardless of the output power Po. These embodiments of the present SMPS reduce the noise due to voltage ripples and limit stress on the transistor due to excessive power input.

While this invention has been described in connection with specific embodiments, it is to be understood that the invention is not limited to the disclosed embodiments, but, on the contrary, is intended to cover various modifications and equivalent arrangements included within the spirit and scope of the appended claims.

What is claimed is:

1. A switching mode power supply (SMPS) comprising:
   a power supply block that comprises a first switch coupled to a first coil of a primary side of a transformer for converting an input voltage, wherein the power supply block supplies power to a second coil and a third coil of a secondary side of the transformer according to an operation of the first switch; and
   a PWM signal generator that receives a feedback voltage corresponding to a first voltage generated in the second coil, a sensing signal corresponding to a current flowing to the first switch, and a third voltage corresponding to a second voltage generated in the third coil to generate a control signal to control on/off of the first switch,
   wherein the PWM signal generator is configured to determine a turn-on time of the first switch according to the input voltage, and the turn-on time is determined regardless of a power magnitude of an output terminal that is connected to the second coil.

2. The SMPS of claim 1, wherein the PWM signal generator is configured to turn on the first switch if the input voltage is lower than a predetermined voltage at a minimum of a first valley of a drain-source voltage that is applied to the first switch and to turn on the first switch if the input voltage is higher than the predetermined voltage at a minimum of a second valley of the drain-source voltage that is applied to the first switch.

3. The SMPS of claim 2, wherein the PWM signal generator comprises:
   a first comparator configured to compare the third voltage with first and second reference voltages, and to output a first signal is at a first level if the third voltage is lower than the first reference voltage, and is at a second level if the third voltage is higher than the second reference voltage;
   a second comparator configured to compare a sensing signal with a feedback voltage and to output a second signal is at a third level if a sensing signal is higher than a feedback voltage, and is at a fourth level if a sensing signal is lower than the feedback voltage;
   a valley selector for receiving the feedback voltage, the first signal, and a third signal to output a valley selection signal for determining a turn-on time of the first switch;
   a first logical block configured to receive the valley selection signal at a first terminal and the second signal at a second terminal, and to output a fourth signal at a sixth level when the second signal changes from the third level to the fourth level or when the second signal changes from the fourth level to the third level while the valley selection signal sustains a fifth level; and
   a second logical block configured to perform a logical operation on the valley selection signal and the fourth signal and to output the third signal at an eighth level when the valley selection signal is at a fifth level and the fourth signal is at a seventh level.

4. The SMPS of claim 3, wherein the PWM signal generator further comprises a gate driver for turning on the first switch if the third signal changes from a ninth level to an eighth level, and turning off the first switch if the third signal changes from the eighth level to the ninth level.

5. The SMPS of claim 4, wherein the valley selector comprises:
   a third comparator configured to compare the fourth voltage with the feedback voltage that is input through a third stage and a fourth stage, respectively, and to output a fifth signal at a tenth level if the fourth voltage is higher than the feedback voltage and at an eleventh level if the fourth voltage is lower than the feedback voltage;
   a first signal generator configured to output the sixth signal at a twelfth level when the fifth signal is at an eleventh level within a first period from a time at which the third signal is changed from the ninth level to the tenth level;
   a third logical block configured to receive the sixth signal and the fifth signal from the fifth terminal and the sixth terminal, respectively, and to output a seventh signal at a fourteenth level when the sixth signal is changed from a twelfth level to a thirteenth level or when the sixth signal is changed from a thirteenth level to a twelfth level while the fifth signal sustains the eleventh level through the first output terminal;
   a second signal generator configured to output an eighth signal at a sixteenth level when the seventh signal sustains the fourteenth level or when the seventh signal is changed from the fourteenth level to a fifteenth level while the third signal sustains the ninth level; and
   a third signal generator configured to output the valley selection signal at a seventeenth level when the first signal is changed from the first level to the second level or when the first signal is changed from the second level to the first level while the first signal is at a second level or while the eighth signal sustains a sixteenth level.

6. The SMPS of claim 5, wherein the valley selector further comprises a voltage supply block configured to supply the fourth voltage, wherein the voltage supply block comprises:
- a first current source with a first current source-terminal connected to a first power source for supplying a fifth voltage;
- a first capacitor with a first capacitor-terminal connected to a second current source-terminal and to a contact point of the fourth terminal and with a second capacitor-terminal connected to the second power source for supplying a sixth voltage; and
- a second switch with a first electrode connected to the first capacitor-terminal and a second electrode connected to the second power source,
- wherein the second switch is configured to be turned on/off by a ninth signal that is output through the second output terminal of the third logical block.

7. The SMPS of claim 6, wherein the third logical block is configured to output the ninth signal at an eighteenth level for turning on the second switch when the fifth signal is changed from the tenth level to the eleventh level or from the eleventh level to the tenth level while the sixth signal sustains the thirteenth level.

8. The SMPS of claim 5, wherein the first signal generator comprises:
- a fourth signal generator configured to generate a ninth signal that sustains an eighteenth level during the first period and that returns to a nineteenth level when the first period terminates; and
- a fourth logical block configured to output the sixth signal in the twelfth level when the ninth signal is at an eighteenth level and the fifth signal is at an eleventh level.

9. The SMPS of claim 8, wherein the fourth signal generator is a one-shot vibrator.

10. The SMPS of claim 5, wherein the second signal generator comprises:
- a fourth logical block configured to output a ninth signal at an eighteenth level when the third signal is at a ninth level and the seventh signal is at the fourteenth level; and
- a fifth logical block configured to receive the ninth signal and the third signal in a seventh stage and an eighth stage, respectively, and to output the eight signal at the sixteenth level when the ninth signal is changed from the eighteenth level to a nineteenth level or from the nineteenth level to the eighteenth level while the third signal sustains the ninth level.

11. The SMPS of claim 5, wherein the third signal generator comprises:
- a fourth logical block configured to output a previous output signal when the first signal is at the first level and for inverting the previous output signal and to output the inverted output signal when the second signal is at the second level;
- a second switch configured to transmit the first signal to the fourth logical block when the eighth signal is at the sixteenth level; and
- a fifth logical block configured to output the valley selection signal at the seventeenth level when the first signal is at the second level or at the first level and when an output signal of the fourth logical block is at an eighteenth level.

12. The SMPS of claim 7, wherein the seventh signal is changed to the fifteenth level after the second period in proportion to a magnitude of the feedback voltage when the third signal is changed to the fourteenth level while the third signal is changed to the eighth level.

13. The SMPS of claim 12, wherein the PWM signal generator is configured to turn on the first switch at a minimum of a first valley of a drain-source voltage that is applied to the first switch if the third signal is changed from the eighth level to the ninth level before the seventh signal is changed from the fourteenth level to the fifteenth level, and to turn on the first switch at a minimum of a second valley of a drain-source voltage that is applied to the first switch if the third signal is changed from the eighth level to the ninth level after the seventh signal is changed from the fourteenth level to the fifteenth level.

14. The SMPS of any one of claims 7, wherein the first level, the fourth level, the fifth level, the seventh level, the ninth level, the eleventh level, the thirteenth level, and the fifteenth level are low levels, and the second level, the third level, the sixth level, the eighth level, the tenth level, the twelfth level, the fourteenth level, the sixteenth level, the seventeenth level, and the eighteenth level are high levels.

15. The SMPS of claim 8, wherein the nineteenth level is a low level.

16. A method of driving an SMPS that is configured to supply power to a second coil of a secondary side of a transformer from an input voltage according to operation of a switch that is coupled to a first coil of a primary side of the transformer, wherein a drain-source voltage of the switch forms a resonant waveform after the switch is turned off, the method comprising:
- a) comparing the input voltage with a predetermined voltage;
- b) turning on the switch if the input voltage is lower than the predetermined voltage at a minimum of a first valley of the resonant waveform; and
- c) turning on the switch if the input voltage is higher than the predetermined voltage at a minimum of a second valley of the resonant waveform.

17. A method of driving an SMPS that supplies power to a second coil of a secondary side of a transformer according to operation of a switch coupled to a first coil of a primary side of the transformer for converting an input voltage and in which a drain-source voltage of the switch forms a resonant waveform after the switch is turned off, comprising:
- a) generating a first signal sustaining a first level during a first period corresponding to a magnitude of a feedback voltage corresponding to a first voltage that is generated in a second coil from the switch is turned on;
- b) comparing a length of the first period with that of a second period in which the switch maintains an ON state;
- c) turning on the switch if the first period is shorter than the second period at a minimum of a first valley of the resonant waveform; and
- d) turning on the switch if the first period is longer than the second period at a minimum of a second valley of the resonant waveform.

* * * * *